United States Patent
Best et al.

(10) Patent No.: US 10,556,665 B2
(45) Date of Patent: Feb. 11, 2020

(54) APPARATUSES AND METHODS FOR IMPROVED SEALING

(71) Applicant: THE BOEING COMPANY, Chicago, IL (US)

(72) Inventors: Steven A. Best, Marysville, WA (US); Jesse Randal Wiseman, Everett, WA (US); Hugh Christopher VanValkenburgh, Seattle, WA (US); John R. Lowell, Fairfax, VA (US)

(73) Assignee: THE BOEING COMPANY, Chicago, IL (US)

( * ) Notice: Subject to any disclaimer, the term of this patent is extended or adjusted under 35 U.S.C. 154(b) by 800 days.

(21) Appl. No.: 15/187,408

(22) Filed: Jun. 20, 2016

(65) Prior Publication Data

US 2017/0361916 A1 Dec. 21, 2017

(51) Int. Cl.
| | | |
|---|---|---|
| *B64C 1/26* | (2006.01) | |
| *B64C 3/34* | (2006.01) | |
| *B64D 37/08* | (2006.01) | |
| *B64F 5/10* | (2017.01) | |
| *B64D 37/32* | (2006.01) | |

(52) U.S. Cl.
CPC .............. *B64C 1/26* (2013.01); *B64C 3/34* (2013.01); *B64D 37/08* (2013.01); *B64D 37/32* (2013.01); *B64F 5/10* (2017.01)

(58) Field of Classification Search
CPC ........... B64C 1/26; B64C 3/34; B64D 37/005; B64D 37/08; B64D 37/32
See application file for complete search history.

(56) References Cited

U.S. PATENT DOCUMENTS

| | | | |
|---|---|---|---|
| 2,289,868 A | 7/1942 | Berick | |
| 2,535,094 A | 12/1950 | Samiran | |
| 2,564,034 A | 3/1951 | Lansing | |
| 2,831,490 A | 4/1958 | Simcock | |
| 4,858,778 A | 8/1989 | Patrick | |
| 6,176,452 B1 * | 1/2001 | Gallegos | B64D 37/06 244/135 B |

(Continued)

FOREIGN PATENT DOCUMENTS

| | | |
|---|---|---|
| EP | 2913273 A1 | 2/2015 |
| WO | 2005079205 A2 | 9/2005 |

OTHER PUBLICATIONS

U.S. Appl. No. 14/954,270, filed Nov. 30, 2015, Specification (22 pages), Drawings (7 pages.).

(Continued)

*Primary Examiner* — Richard R. Green
(74) *Attorney, Agent, or Firm* — Joseph F. Harding; The Small Patent Law Group LLC

(57) ABSTRACT

A dry bay sealing assembly is provided that includes a first end plate and a second end plate that are configured to be disposed on respective opposite first and second sides of a structural member proximate to a joint defined between the structural member and a fitting. The first end plate and the second end plate are configured to define an interior volume therebetween containing at least a portion of a fastener joining the structural member and the fitting. The first end plate and the second end plate are configured to cooperate with the structural member to seal the interior volume from an exterior volume.

20 Claims, 7 Drawing Sheets

(56) References Cited

U.S. PATENT DOCUMENTS

| | | |
|---|---|---|
| 7,837,148 B2 | 11/2010 | Kismarton et al. |
| 7,887,009 B2 | 2/2011 | Keeler, Jr. et al. |
| 8,616,499 B2 * | 12/2013 | Tucker .................. B64C 3/34 244/123.1 |
| 8,993,097 B2 | 3/2015 | Kwon et al. |
| 9,897,130 B2 * | 2/2018 | Aston .................. B64D 45/02 |
| 9,939,006 B2 * | 4/2018 | Song .................. F16B 33/004 |
| 2009/0147429 A1 | 6/2009 | Hernandez |
| 2015/0041589 A1 | 2/2015 | Hasan et al. |
| 2017/0050746 A1 * | 2/2017 | Dobbin .................. B64D 45/02 |

OTHER PUBLICATIONS

U.S. Appl. No. 15/142,464, filed Apr. 29, 2016, Specification (22 pages), Drawings (2 pages.).
Extended European Search Report for co-pending European Application No. 17165840.1-1754, dated Oct. 26, 2017 (9 pages).
International Search Report for PCT Application No. PCT/US04/38149, dated Dec. 15, 2006 (4 pages).

* cited by examiner

APPARATUSES AND METHODS FOR IMPROVED SEALING

FIELD OF EMBODIMENTS OF THE DISCLOSURE

Embodiments of the present disclosure generally relate to sealing difficult to reach areas, for example joints between fittings and/or structural matters in a fuel-filled volume, such as an aircraft wing.

BACKGROUND OF THE DISCLOSURE

One or more metallic components may be disposed within an environment or volume that will contain a flammable material (e.g., fuel). To protect against ignition from sparks, sealant may be applied to the metallic components. However, the metallic components may be in difficult to reach areas, resulting in a relatively large amount of time, expense, and/or inconvenience in applying sealant. Further, a relatively large amount of sealant may be required to individually seal components.

SUMMARY OF THE DISCLOSURE

Accordingly, improvement of sealing objects is provided in various embodiments disclosed herein.

Certain embodiments of the present disclosure provide a dry bay sealing assembly that includes a first end plate and a second end plate that are configured to be disposed on respective opposite first and second sides of a structural member proximate to a joint defined between the structural member and a fitting. The first end plate and the second end plate are configured to define an interior volume therebetween containing at least a portion of a fastener joining the structural member and the fitting. The first end plate and the second end plate are configured to cooperate with the structural member to seal the interior volume from an exterior volume.

Certain embodiments of the present disclosure provide a method. The method includes joining a structural member to a fitting at a joint using at least one fastener. The at least a portion of the at least one fastener extends into an interior of the structural member. The method also includes positioning a first end plate on a first side of the structural member. Also, the method includes positioning a second end plate on a second side of the structural member to define an interior volume. The at least a portion of the at least one fastener that extends into the interior of the structural member is contained within the interior volume. Further, the method includes sealing at least the first end plate, second end plate, and structural member to provide a seal between the interior volume and an exterior volume.

Certain embodiments of the present disclosure provide an airplane wing joint assembly that includes a fitting, a structural member, a first end plate, and a second end plate. The fitting is configured to be joined to a body of the airplane. The structural member is configured to be joined to a wing of the airplane. The wing defines a fuel carrying volume. The structural member is joined to the fitting at a joint by at least one fastener. The first end plate and the second end plate are disposed on respective opposite first and second sides of the structural member proximate to the joint defined between the structural member and the fitting. The first end plate and the second end plate are configured to define an interior volume therebetween containing at least a portion of the at least one fastener joining the structural member and the fitting. The first end plate and the second end plate cooperate with the structural member to seal the interior volume from the fuel carrying volume.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for sealing difficult to reach areas, for example for spark protection within a surrounding volume of fuel. Various embodiments provide a dry bay sealing assembly to create a dry bay, pocket, or sub-volume that is isolated from a surrounding volume (e.g., a fuel-filled surrounding volume). Various embodiments provide reduced cost for sealing difficult to reach areas. Various embodiments provide reduced time for sealing difficult to reach areas. Various embodiments provide for reduced effort or improved operator convenience in applying sealant (e.g., to difficult to reach areas).

Figure 1:
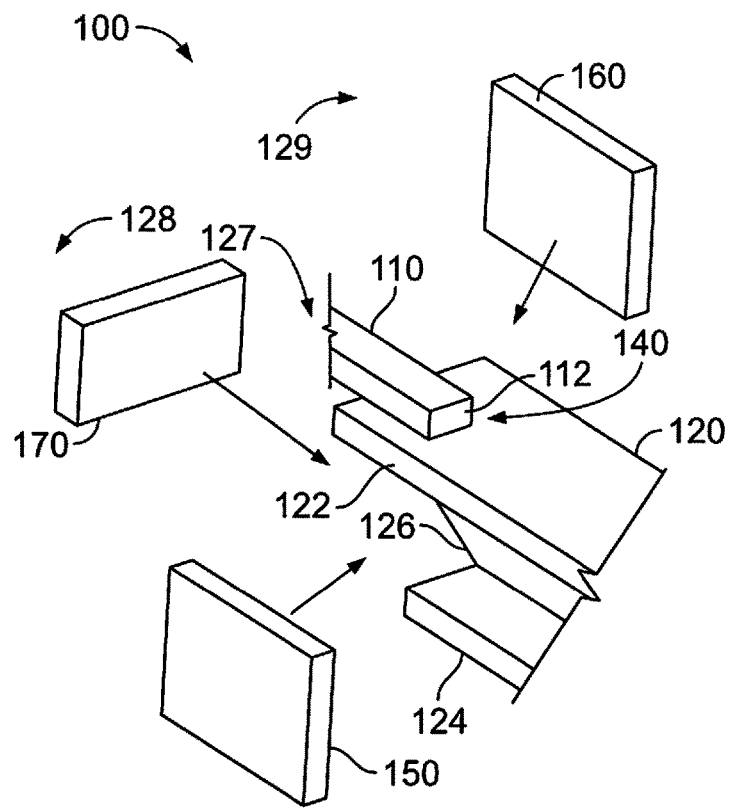
FIG. 1 provides a schematic exploded view of a dry bay sealing assembly used in connection with a fitting and structural member in accordance with various embodiments.

FIG. 1 provides an exploded schematic view of a dry bay sealing assembly 100 used in conjunction with a fitting 110 and a structural member 120. Generally, the dry bay sealing assembly 100 may be sealed to provide a pocket or sub-volume that is sealed off from a larger volume, for example to reduce or eliminate the amount of sealant required for components within the pocket or sub-volume, reduce or eliminate the amount of time to seal the components within the pocket or sub-volume, and/or reduce or eliminate the effort or expense required to seal the components within the pocket or sub-volume. For example, hard to reach components may be surrounded by and isolated from a surrounding volume by the dry bay sealing assembly 100 instead of being individually sealed. The dry bay sealing assembly 100, for example, may be used to isolate metallic parts from a volume of fuel. In some embodiments, the dry bay sealing assembly 100 may be used to isolated metallic parts (e.g., fasteners or portions thereof) from a volume of fuel. For instance, an airplane's wing may be used to contain fuel, and structural components inside the wing may be joined to a body of the airplane using one or more fittings or fasteners. Instead of individually sealing difficult to reach fasteners or portions thereof to prevent sparks, the dry bay sealing assembly 100 may be used to conveniently create a pocket within the fuel volume that is isolated from the fuel. It may be noted that in various embodiments the dry bay sealing assembly 100 defines a volume therein that remains "dry" or free of sealant throughout manufacture and use of an associated product or system (e.g., an airplane). For example, any components (e.g., fasteners or portions thereof) disposed within the interior volume of the dry bay sealing assembly may be devoid of sealant.

Figure 2:
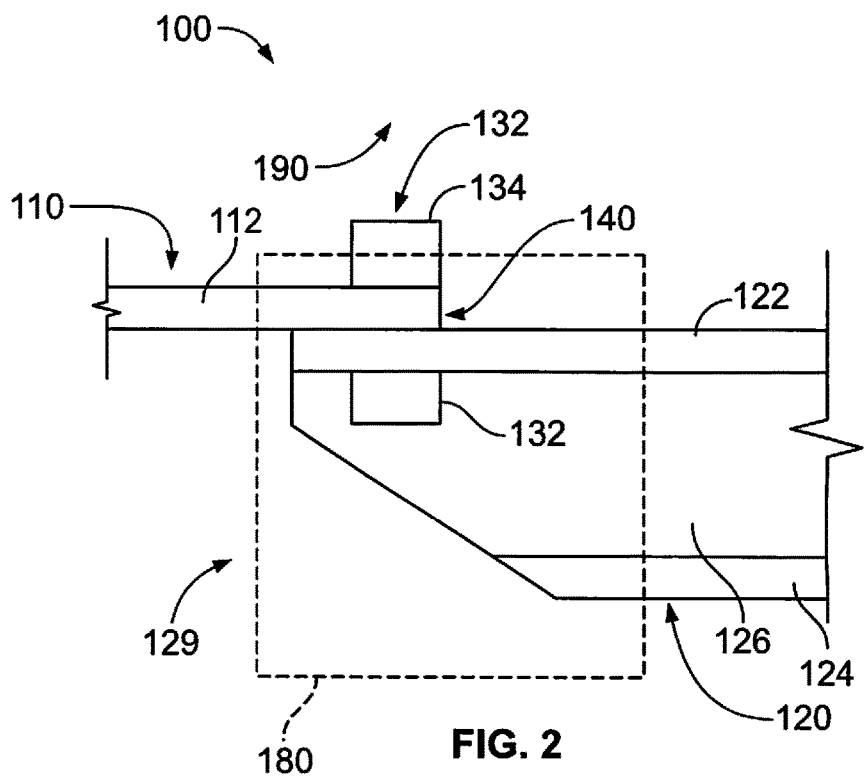
FIG. 2 illustrates a side schematic view of the dry bay sealing assembly, fitting, and structural member of FIG. 1.

In the illustrated embodiment, the fitting 110 is shown joined to the structural member 120. The structural member 120 has a first side 128 and a second side 129. Further, as best seen in FIG. 2, the structural member 120 is joined to the fitting 110 with a fastener 130, defining a joint 140. The structural member 120 has a front end 127 proximate the fitting 110. As seen in FIGS. 1 and 2, the structural member 120 includes a web 126 that is interposed between a first flange 122 and a second flange 124. The first flange 122 is joined to a fitting flange 112 of the fitting 110 by the fastener 130, while the second flange 124 may be joined to a different structure, such as an aircraft wing panel (not shown in FIGS. 1 and 2).

As best seen in FIG. 1, the dry bay sealing assembly 100 includes a first end plate 150 and a second end plate 160. The first end plate 150 and the second end plate 160 are configured to be disposed, respectively, on the opposite first side 128 and second side 129 of the structural member 120. In the illustrated embodiment, the first end plate 150 is configured to be disposed on the first side 128 of the structural member 120, and the second end plate 160 is configured to be disposed on the second side 129 of the structural member 120. The first end plate 150 and the second end plate 160 are disposed proximate the joint 140 defined between the structural member 120 and the fitting 110. The first end plate 150 and the second end plate 160 define an interior volume 180 (shown schematically in phantom lines in FIG. 2 with the first end plate 150 and second end plate 160 removed). As seen in FIG. 2, a portion 132 of the fastener 130 is contained within the interior volume 180. The first end plate 150 and the second end plate 160 cooperate with the structural member 120 to seal the interior volume 180 from an exterior volume 190 (e.g., a volume containing fuel). Additional structures, such as the fitting 110, a panel to which the structural support 120 is mounted and provides support, other fittings, or the like, may also cooperate to seal the interior volume. A component may be understood as cooperating to seal the interior volume 180 when the component connects or interacts with another component to provide a sealed barrier or border isolating the interior volume 180 from the exterior volume 190. For example, two or more components may be understood as cooperating to seal the interior volume 180 when joints or connections between or among the components are sealed (e.g., with a sealant) to provide a barrier between the interior volume 180 and the exterior volume 190. Accordingly, hard to reach components such as the portion 132 of the fastener 130 may be surrounded by and isolated from a surrounding volume by the dry bay sealing assembly 100 instead of being individually sealed. Components more easily reached, such as upper portion 134 of fastener 130 may be individually sealed. It may be noted that in the illustrated embodiment the interior volume 180 remains "dry" or free of sealant throughout manufacture and use of an associated product or system (e.g., an airplane). For example, the portion 132 disposed within the interior volume 180 of the dry bay sealing assembly 100 is devoid of sealant.

As discussed herein, in various embodiments, the structural member 120 includes a web 126 that extends between the first flange 122 and the second flange 124. For example, in various embodiments, the structural member 120 may be configured as an I-beam. It may be noted that other configurations or shapes of the structural member 120 may be utilized in different embodiments. As seen in FIG. 1, the depicted first end plate 150 and second end plate 160 are configured to be mounted on opposite sides of the web 126 (e.g., the first end plate 150 is disposed on the first side 128 and the second end plate 160 is disposed on the second side 129). It should be noted that the first end plate 150 and the second end plate 160 are depicted as generally rectangular slabs in FIG. 1 for clarity and ease of illustration; however, different shapes may be used in practice for various embodiments. For example, the first end plate 150 and the second end plate 160 in various embodiments are shaped to match or correspond to contours of the structural member 120 (and/or other structures, such as the fitting 110, a wing panel surface, and/or one or more other fittings). As one example, the first end plate 150 and/or second end plate 160 may include one or more features or extensions that extend toward the web 126. The end plates may be shaped to correspond to a contour by having a shape that, when the given end plate is mounted in position, follows the contour with a slight clearance that may be filled with sealant.

In the depicted example, as seen in FIG. 1, the first flange 122 extends toward the front end 127 of the structural member 120 farther than the second flange 124 (and portions of the web 126) extends toward the front end 127. The dry bay sealing assembly 100 in the illustrated example also includes a bridge 170. The bridge 170 is configured to extend between the first end plate 150 and the second end plate 160 proximate the front end 127 (e.g., to help seal off the front end 127). Accordingly, the bridge 170 in the illustrated embodiment cooperates with the first end plate 150 and the second end plate 160 to provide the sealed interior volume 180. It may be noted that the bridge may cooperate with additional structures, such as an inner surface of a wing panel, the fitting 110, and/or additional fittings.

Figure 3:
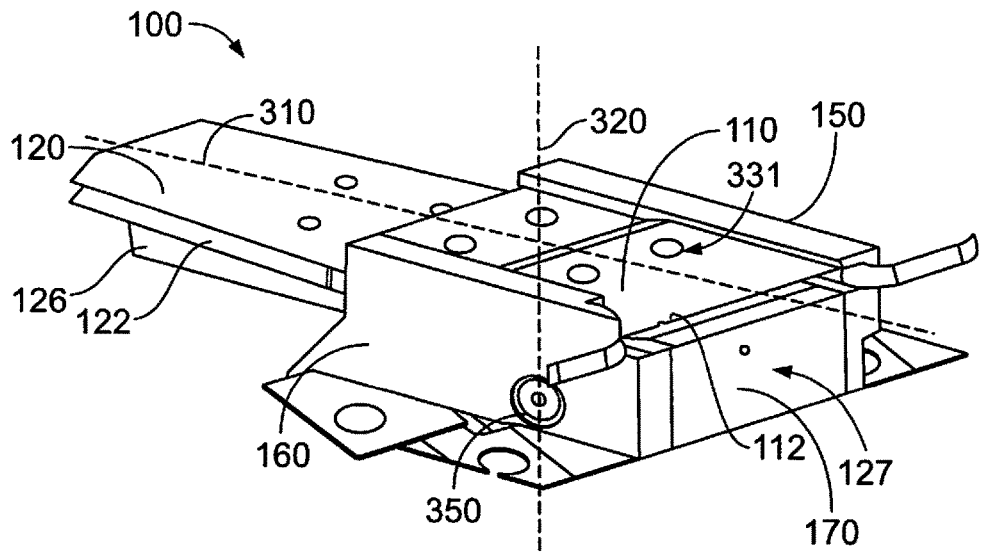
FIG. 3 illustrates a schematic perspective view of the dry bay assembly of FIG. 1 assembled around the fitting and structural member.

FIG. 3 provides a schematic perspective view of the dry bay sealing assembly 100 in an assembled condition around the fitting 110 and structural member 120. As seen in FIG. 3, the first end plate 150 and the second end plate 160 are joined by a fastener 350 that extends across the structural member 120. The fastener 350, for example, may extend past a portion of the web 126 that does not extend to meet the front end 127 or bridge 170. In the illustrated embodiment, the fastener 350 extends at an oblique (i.e., neither parallel nor perpendicular) angle to a plane defined along the center line 310 and passing through the web 126. The angled orientation of the fastener 350 in various embodiments provides for easier access for tightening the fastener 350, for example. To assemble the dry bay sealing assembly 100, the bridge 170 may first be positioned proximate the fitting 110 to cover an open end of the structural member 120. Then, the first end plate 150 and the second end plate 160 may be joined against or near the sides of the structural member 120, with the bridge 170 positioned between the first end plate 150 and the second end plate 160 proximate the front end 127. Next, the fastener 350 may be used to secure the first end plate 150 to the second end plate 160 (and the bridge 170 to each). Next, sealant may be applied to joints or connections associated with the components of the dry bay assembly 100 to seal off the interior volume 180 from the exterior volume 190. As also seen in FIG. 3, holes 331 pass through the fitting flange 112 of the fitting 110 as well as the first flange 122 of the structural member 120 for use with fastener 130. With four holes 331 as seen in FIG. 3, four fasteners 130 may be used. Additionally, portions of fasteners used to join other components, such as joining the fitting 110 to a mounting surface (such as an inner surface of a wing panel) may be contained within the interior volume 180.

Figure 4:
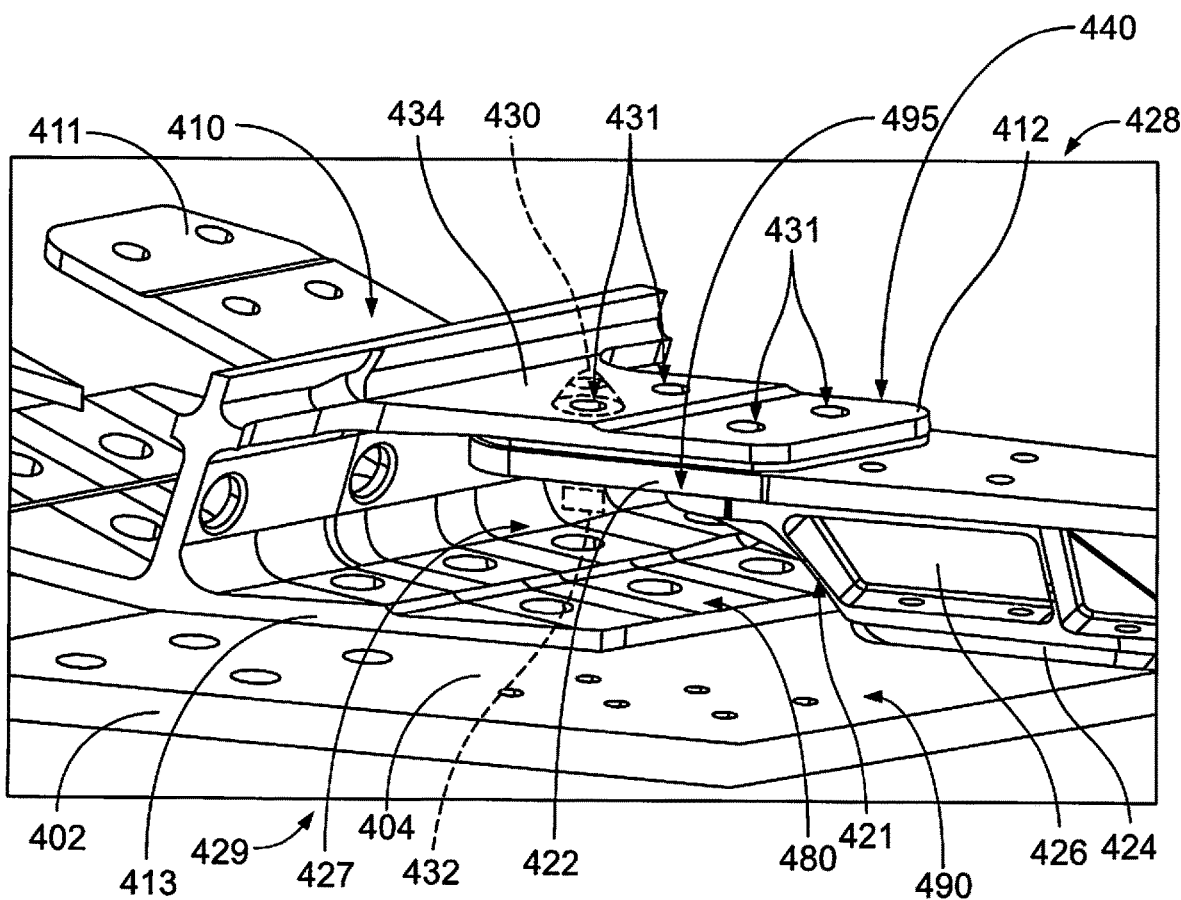
FIG. 4 provides a perspective view of an airplane wing joint assembly (with end plates removed) in accordance with various embodiments.
Figure 5:
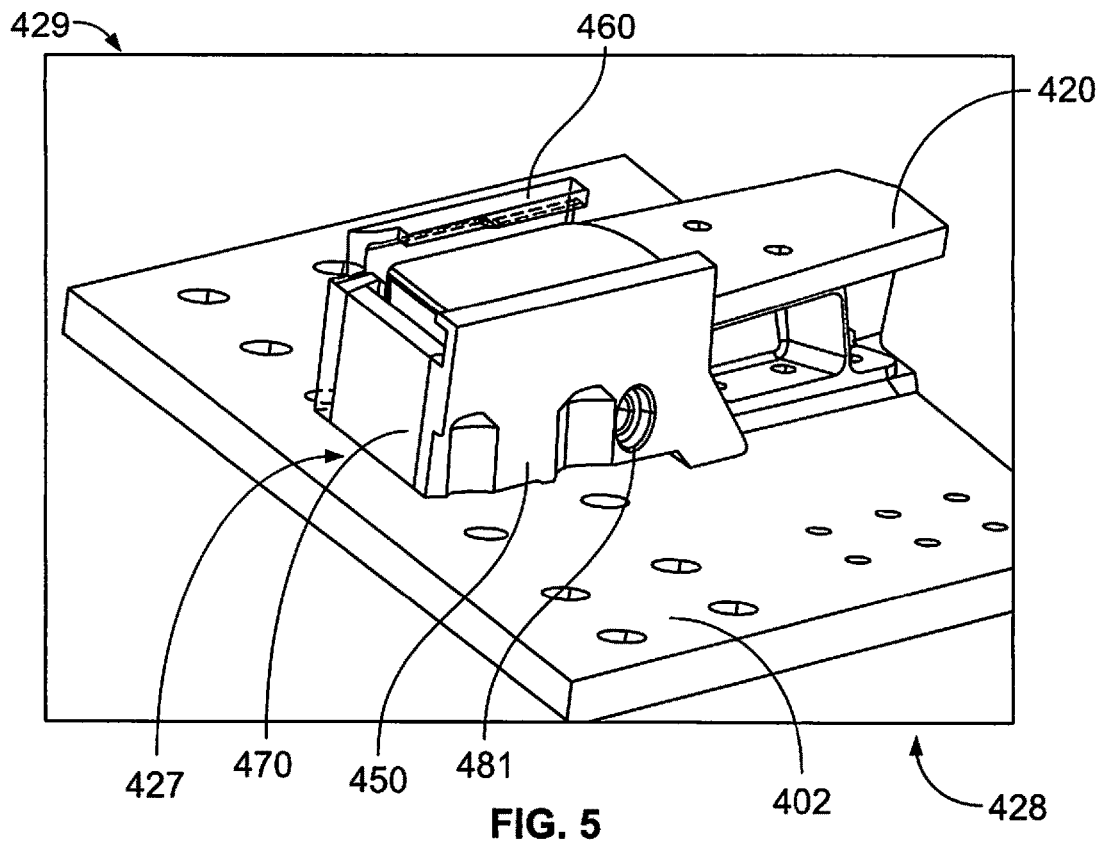
FIG. 5 depicts a perspective view of the airplane wing joint assembly of FIG. 4 with the end plates in place and the fitting removed.
Figure 6:
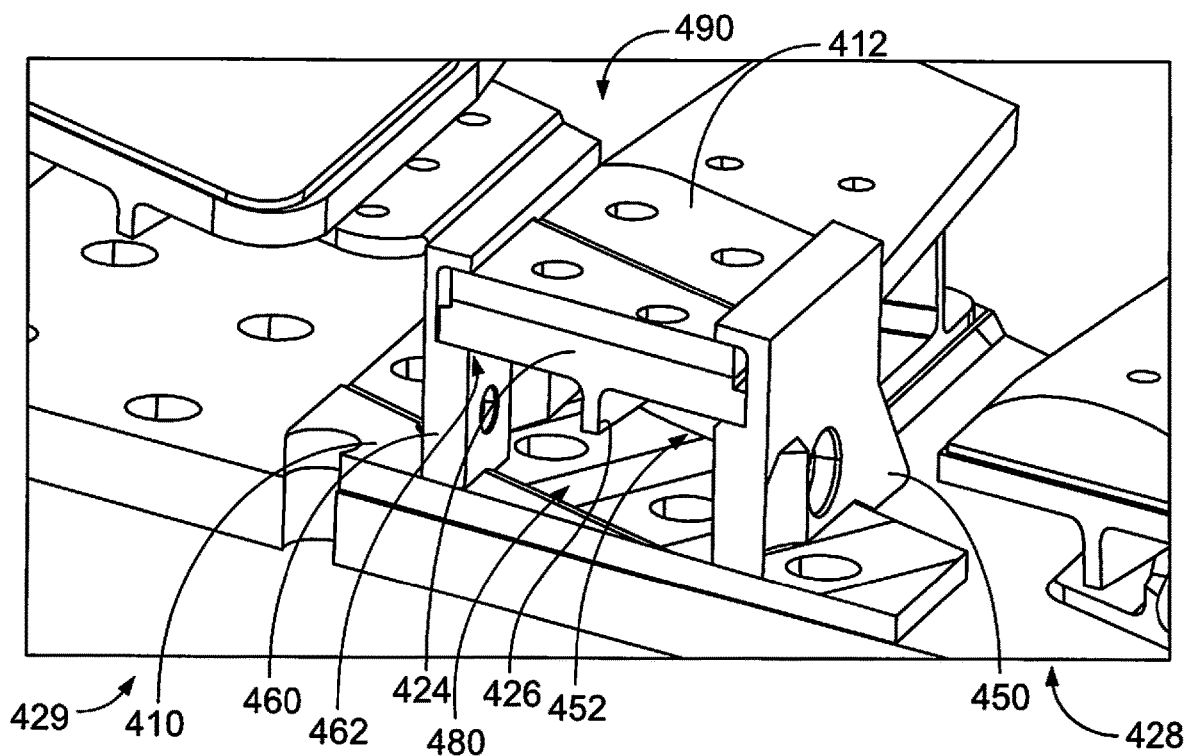
FIG. 6 depicts a sectional perspective view of the airplane wing joint assembly of FIGS. 4-5.
Figure 7:
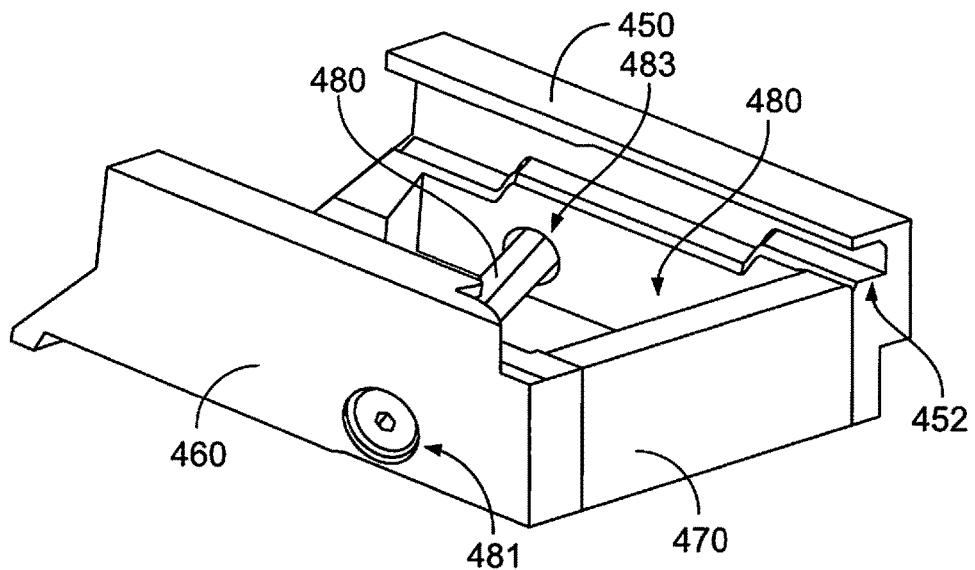
FIG. 7 depicts a perspective view of end plates and a bridge of the airplane wing joint assembly of FIGS. 4-6.
Figure 8:
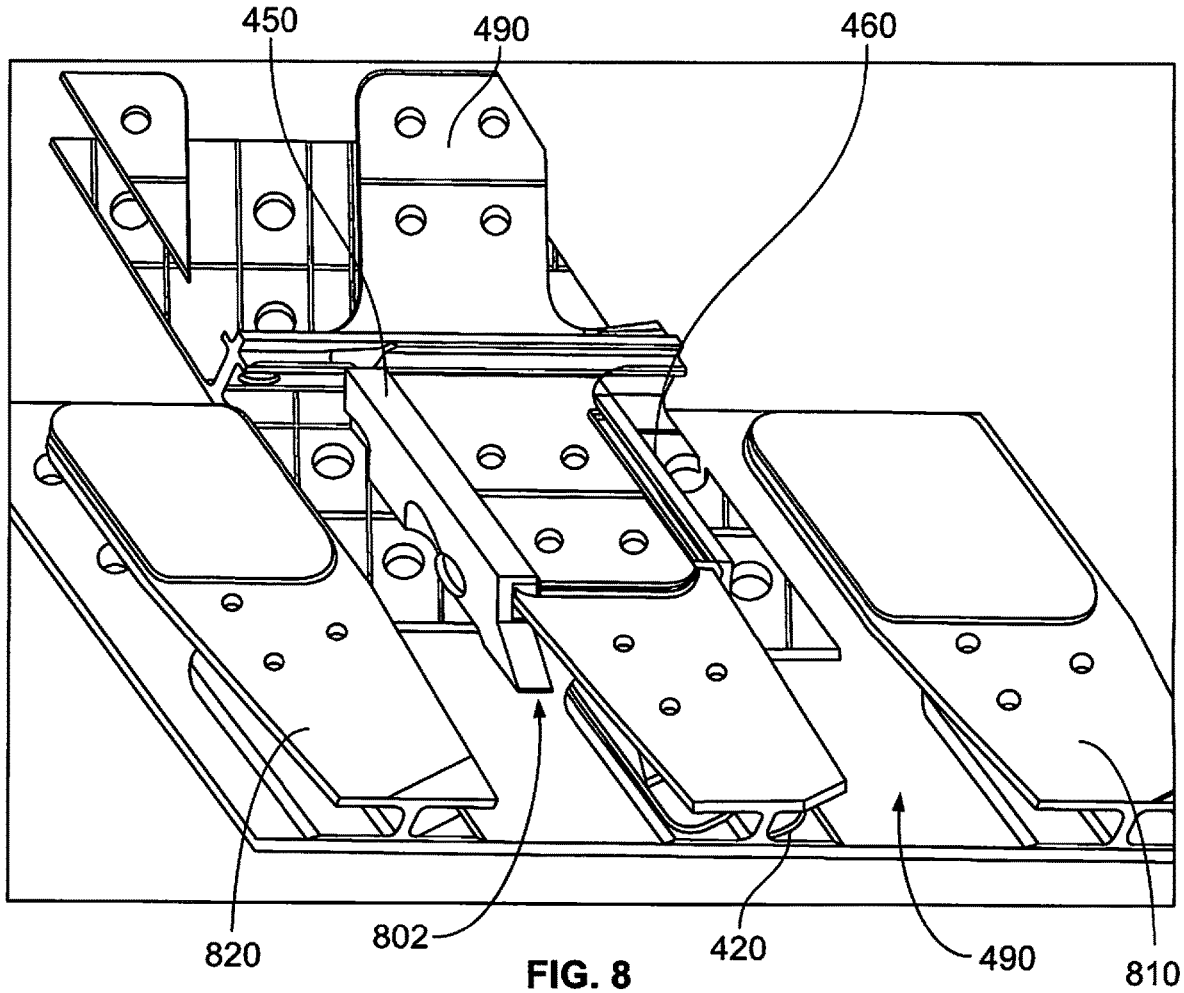
FIG. 8 provides a perspective view of the airplane wing joint assembly of FIGS. 4-7.

As discussed herein, various embodiments may be used in connection with joining aircraft wings configured to hold fuel with a body of the aircraft. FIGS. 4-8 depict various views of an airplane wing joint assembly 400. FIG. 4 provides a perspective view of the airplane wing joint assembly 400 with end plates removed; FIG. 5 depicts a perspective view of the airplane wing joint assembly 400 with the fitting removed; FIG. 6 depicts a sectional perspective view of the airplane wing joint assembly 400; FIG. 7 depicts a perspective view of end plates and a bridge of the airplane wing joint assembly 400; and FIG. 8 provides a perspective view of the airplane wing joint assembly 400. It may be noted that the particular numbers, sizes, shapes, and arrangements of the various components shown in FIG. 4-8 are meant by way of example, and the numbers, sizes, shapes, and arrangements may be varied in different embodiments.

As seen in FIGS. 4 and 5, the airplane wing joint assembly 400 includes a fitting 410, a structural member 420, a first end plate 450, a second end plate 460, a bridge 470 and an end plate fastener 480. The fitting 410, for example, may be made of titanium, and configured for joining a wing of an airplane to a body of an airplane. For example, the depicted fitting includes a fitting flange 412 configured to mount to the structural member 420, a second flange 413 configured to mount to an inner panel surface 404 of a wing 402, and a body flange 411 configured to mount to a body (not shown in FIGS. 4-8) of an airplane.

The structural member 420 of the depicted embodiment includes a first flange 422 and a second flange 424 joined by a web 426. The web 426 extends between the first flange 422 and the second flange 424 along at least a portion of the length of the structural member 420. As seen in FIG. 4, the first flange 422 extends toward a front end 427 of the structural member 420 farther than the second flange 424 (and portions of the web 426) extends toward the front end 427. The structural member 420 in the illustrated example is configured as a stringer providing structural support to a lower wing panel. Additional stringers to support the upper and/or lower wing panel may also be utilized, but are not shown in FIG. 4, for example, for clarity of illustration.

As seen in FIG. 4, a fastener 430 (while four fastener holes 431 for four corresponding fasteners 430 are shown in FIG. 4, only one faster 430 is depicted for clarity of illustration) shown in dashed lines joins the first flange 422 of the structural member 420 to the fitting flange 412. Additional fasteners (not shown) may be used to join the lower flange 424 of the structural member 420 to the inner panel surface 404, to join the second flange 413 of the fitting 410 to the inner panel surface 404, or to join the fitting 410 and/or structural member 420 to other fittings or structures. The fastener 430 in various embodiments is sealed to inhibit spark formation. As seen in FIG. 4, the fastener 430 includes an upper portion 434 and a lower portion 432. The upper portion 434 is relatively easily accessible for sealant application; however, access to the lower portion 432 is relatively more difficult.

The wing 402 defines a fuel carrying volume 490. For example, at least a portion of the interior of the wing 402 may be used to carry fuel. Accordingly, the fastener 430 may be sealed to prevent sparks. Because the lower portion 432 of the fastener 430 is relatively difficult to access, sealing may be made easier and more efficient by defining a pocket or sub-volume around the lower portion 432 and sealing the pocket instead of individually sealing the lower portion 432 and/or other fasteners or fastener portions within the pocket or sub-volume. In the illustrated embodiment, as best seen in FIGS. 4-6, the first end plate 450, second end plate 460, and bridge 470 cooperate with various structures to define an interior volume 480 containing at least the lower portion 432 of the fastener 430, and to seal the interior volume 480 from the fuel carrying volume 490. In the illustrated embodiment, the interior volume 480 is bounded or defined by portions of the interior surfaces of the first end plate 450, second end plate 460, and bridge 470, as well as the second flange 413 of the fitting 410, a front surface 421 of the structural member 420, the inner panel surface 404, and an underside of the first flange 422 of the structural member 420.

As best seen in FIGS. 5-7, the first end plate 450 and the second end plate 460 are disposed on respective opposite sides (first end plate 450 on first side 428 and second end plate 460 on second side 429) of the structural member 420. The first end plate 450 and the second end plate 460 are disposed proximate to joint 440 defined between the structural member 420 and the fitting 410. For example, the first end plate 450 and the second end plate 460 may be used (along with other structures) to define a sealed-off volume (e.g., interior volume 480) isolating fasteners (or portions thereof) associated with the joint 440 (e.g., lower portion 432 of fastener 430).

As best seen in FIG. 5, the bridge 470 extends between the first end plate 450 and the second end plate 460 proximate the fitting 410 (omitted from FIG. 5 for clarity of illustration) or front end 427 Accordingly, the first end plate 450 covers portions of the first side 428 of the structural member 420 and fitting 410, the second end plate 460 covers portions of the second side 429 of the structural member 420 and fitting 410, and the bridge 470 helps seal an otherwise open area proximate the front end 427 (e.g., caused by the extension of the first flange 422 past the second flange 424). It may be noted that the front surface 421 of the structural member (see FIG. 4) in various embodiments helps seal an area opposite to and facing the bridge 470. Generally, the first end plate 450, second end plate 460, and bridge 470 cooperate to form a U-shaped structure defining three sides of the interior volume 480. The joints or boundaries between the first end plate 450 and the bridge 470, the second end plate 460 and the bridge 470, as well as the joints or boundaries between the first end plate 450, second end plate 460, and bridge 470 and other structures or components may be covered with a sealant to seal the interior volume 480 from the fuel carrying volume 490, allowing individual sealing of components such as fastener portions within the interior volume to be eliminated or reduced. It may be noted that, in various embodiments, one or more of the first end plate 450, second end plate 460, or bridge 470 may include guides or channels (on the interior and/or exterior of a plate) or manifolds for guiding and delivering sealant to a joint or boundary.

It may be noted that in various embodiments, the structural member 420 may include one or more contours 495, for example defining a side profile of the structural member (e.g., along the first side 428 and/or the second side 429). The first end plate 450 and/or the second end plate 460 may be formed to correspond to the contour to improve ease and completeness of sealing. For example, the first end plate 450 may match or correspond to the contour of the first side 428, and the second end plate 460 may match or correspond to the contour of the second side 429. It may be noted that the first end plate 450 and second end plate 460 (or portions thereof) in various embodiments are shaped to match or correspond to contours of additional structures or portions thereof, such as the fitting 410 and/or one or more other fittings. As discussed herein, the end plates may be shaped to correspond to a contour or contours by having a shape that, when the given end plate is mounted in position, follows the contour or contours with a slight clearance that may be filled with sealant.

In various embodiments, the first end plate 450 and/or the second end plate 460 may include one or more channels or other features that accept one or more portions of the fitting 410 and/or structural member 420. For example, in the illustrated example, as best seen in FIG. 6, the first flange 422 and the fitting flange 412 are adjacent to and secured to each other. The first end plate 450 comprises a channel 452 that accepts the first flange 422 and the fitting flange 412 (e.g., end portions of the first flange 422 and the fitting flange 412 proximate the first side 428 are disposed within the channel 452 when the first end plate 450 is mounted in its intended position). Also, the second end plate 460 comprises a channel 462 that accepts the first flange 422 and the fitting flange 412 (e.g., end portions of the first flange 422 and the fitting flange 412 proximate the second side 429 are disposed within the channel 462 when the second end plate 460 is mounted in its intended position). Use of the channels 452, 462 in various embodiments helps accurately and reliably position the first end plate 450 and the second end plate 460. It may be noted the first end plate 450 and the second end plate 460 may also include channels that accept opposite ends of the bridge 470 to accurately and reliably position the bridge 470 between the first end plate 450 and the second end plate 460 before securing the first end plate 450 and the second end plate 460 in place.

As best seen in FIG. 7, the first end plate 450 and the second end plate 460 may be secured to each other with a fastener 480. In the illustrated embodiment, the fastener 480 extends across the structural member 420 (not shown in FIG. 7 for clarity of illustration) and joins the first end plate 450 and the second end plate 460. For example, the fastener 480 may pass closer to the front end 427 than a truncated portion of the web 426. As another example, the web 426 may have a clearance hole passing therethrough to allow passage of the fastener. The first end plate 450 and the second end plate 460 have corresponding fastener holes 483, 481 through which the fastener 480 passes. As also seen in the example depicted in FIG. 7, the fastener 480 extends at an oblique angle relative to a centerline of the structural member 420, or at an oblique angle to a plane defined by the web 426 of the structural member 420.

FIG. 8 illustrates a perspective view of the wing joint assembly 400. In the illustrated example, a stringer 820 and a stringer 810 are disposed on opposite sides of the structural member 420 and extend along the length of the wing. In various embodiments the fitting 410 extends along the width of the wing and includes flanges or features for mounting to the stringer 320 and stringer 810 (along with other stringers). A dry bay sealing assembly 802 shown in FIG. 8 provides a pocket (e.g., interior volume 480) sealed off from the fuel carrying volume 490. The dry bay sealing assembly 802 includes the first end plate 450, second end plate 460, and bridge 470 (not shown in FIG. 8). Generally similar dry bay sealing assemblies may be similarly used with stringer 810 and stringer 820 (as well as other stringers of the wing). However, because each stringer in various embodiments has a different geometrical arrangement than adjacent stringers, the dry bay sealing assembly for each stringer may be individually tailored (e.g., having one or more contours matching a contour of the stringer and/or corresponding fitting portion) for that particular stringer. It may be noted that the illustrated view provides only a view of a portion of a wing assembly, and that the fitting 410 may extend further along the width of the wing, and additional stringers may be utilized. In the illustrated embodiment, the dry bay sealing assembly 802 includes three pieces (first end plate 450, second end plate 460, bridge 470) that are separately positioned before being joined. However, for example, in embodiments with greater spacing between stringers that allows for placement of larger pieces, the bridge 470, for example, may be pre-formed with one of the end plates (e.g., the bridge 470 and first end plate 450 may be portions of an integral, pre-formed piece having a general L-shape).

Figure 9:
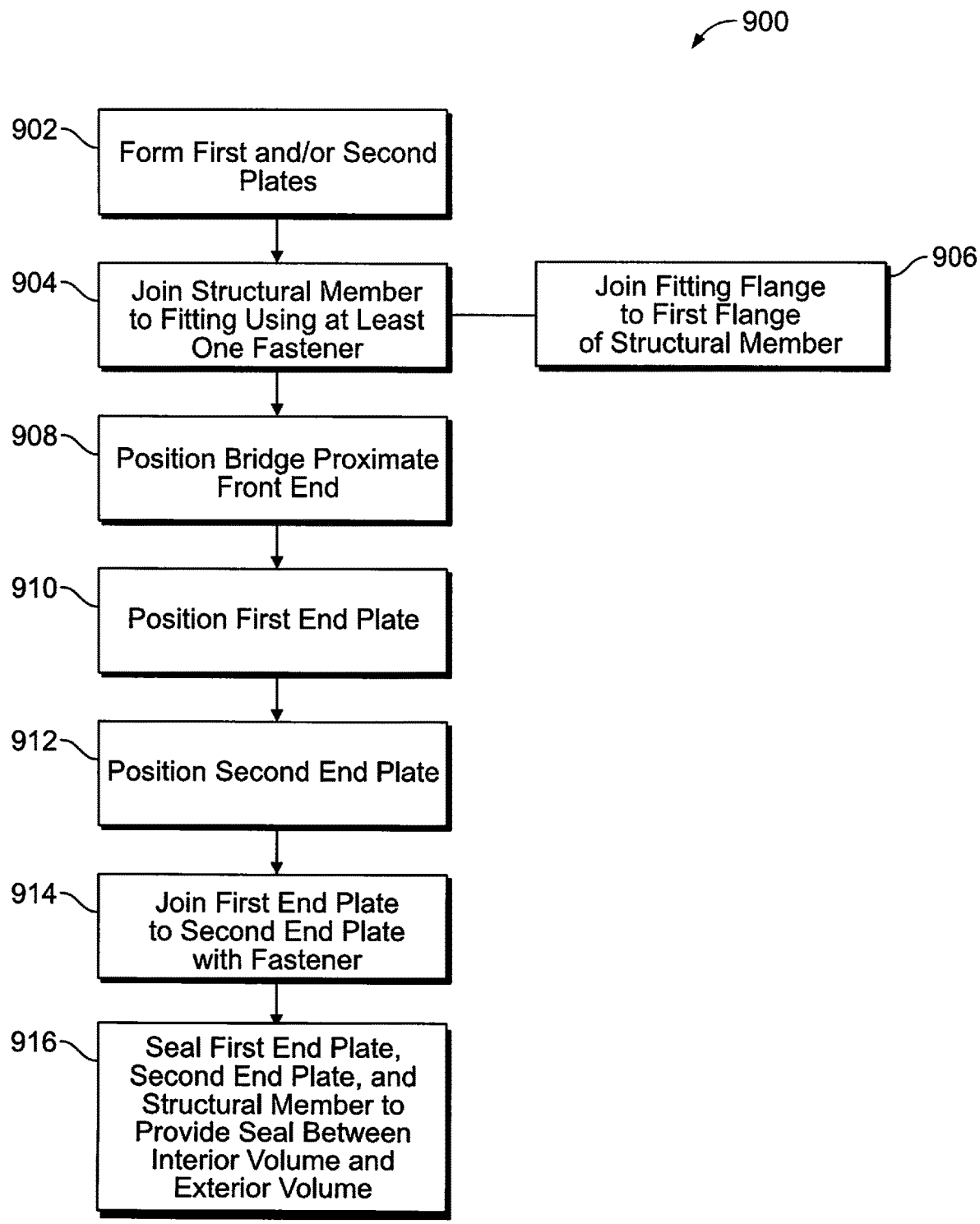
FIG. 9 provides a flowchart of a method according to an embodiment of the present disclosure.

FIG. 9 provides a flowchart of a method 900 for providing a sealed sub-volume within a larger volume, in accordance with various embodiments. The method 900, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 902, a first and/or second end plate (e.g., first end plate 150, 450, second end plate 160, 460) is formed. Additional components (e.g., bridge 170, bridge 470) may also be formed. In some embodiments, the first end plate, second end plate, and/or bridge is 3D printed. The particular shape in which the components are formed may be based on structural aspects (e.g., structural member 120, 420, fitting 110, 410) with which the components will be used. Each particular component (first end plate, second end plate, bridge) may be custom tailored or configured to match contours or features of surrounding structure, such as structural members, fitting, panels, or the like. For embodiments in which plural sub-volumes to be sealed off from a surrounding volume are formed, separate components may be individually tailored for each sub-volume to be formed.

At 904, a structural member (e.g., structural member 120, 420) is joined to a fitting (e.g., fitting 110, 410) using at least one fastener (e.g., fastener 130, 430). At least a portion of the fastener may extend into an interior of the structural member (e.g., into an interior volume such as interior volume 180 or 480). In some embodiments, at 906, a fitting flange of the fitting is joined to a first flange of the structural member. The interior of the structural member may be difficult to access for sealing. Accordingly, in various embodiments, a pocket or sub-volume may be created around the portion of the fastener extending into the interior of the structural member for convenient and efficient sealing.

At 908, a bridge (e.g., bridge 170, 470) is positioned proximate a front end of the structural member (or proximate the fitting). The bridge is positioned between mounting locations for first and second end plates (e.g., end plates formed at 902).

At 910, the first end plate is positioned. For example, the first end plate is positioned on a first side of the structural member in the depicted example. In some embodiments, the first end plate includes a channel that may be positioned to accept features of the fitting and/or structural member, such as ends of the fitting flange and the first flange joined at 906.

At 912, the second end plate is positioned. For example, the second end plate is positioned on a second side (e.g., on an opposite side of the structural member from the first end plate) of the structural member in the depicted example. The positioning of the second end plate, along with the first end plate and/or other structures such as the bridge, structural member, and fitting, defines an interior volume. The at least a portion of the fastener that extends into the interior of the structural member is contained within the interior volume. In some embodiments, the second end plate includes a channel that may be positioned to accept features of the fitting and/or structural member, such as ends of the fitting flange and the first flange joined at 906).

At 914, the first end plate is joined to the second end plate with a fastener (e.g., fastener 180, 480). In some embodiments, the fastener extends across the structural member at an oblique angle to a plane defined by a web of the structural member.

At 916, the first end plate, second end plate, and structural member are sealed to provide a seal between the interior volume and the exterior volume. The seal, for example, may isolate one or more metallic components (e.g., fasteners or portions thereof) from a surrounding volume of fuel for spark protection. The sealant used may be the same or generally similar to conventional sealant used for spark protection. It may be noted that in various embodiments the interior volume defined within the combination of the first end plate, second end plate, and structural member remains "dry" or free of sealant throughout manufacture and use of an associated product or system (e.g., an airplane). For example, any components (e.g., fasteners or portions thereof) disposed within the interior volume of the dry bay sealing assembly may be devoid of sealant, and remain devoid of sealant, throughout manufacture and use.

Figure 10:
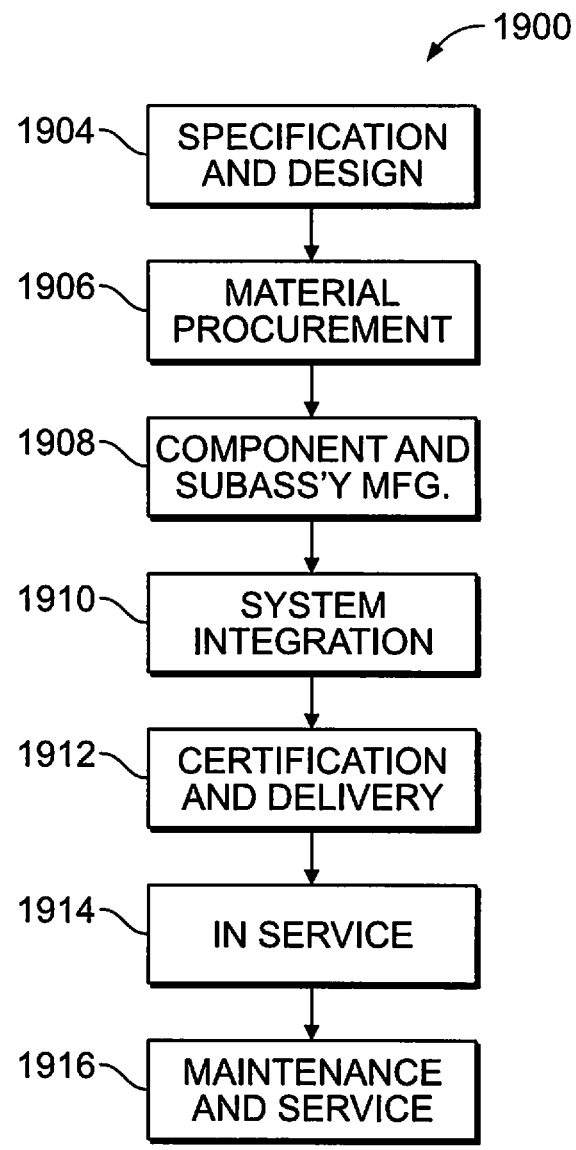
FIG. 10 is a block diagram of aircraft production and service methodology.
Figure 11:
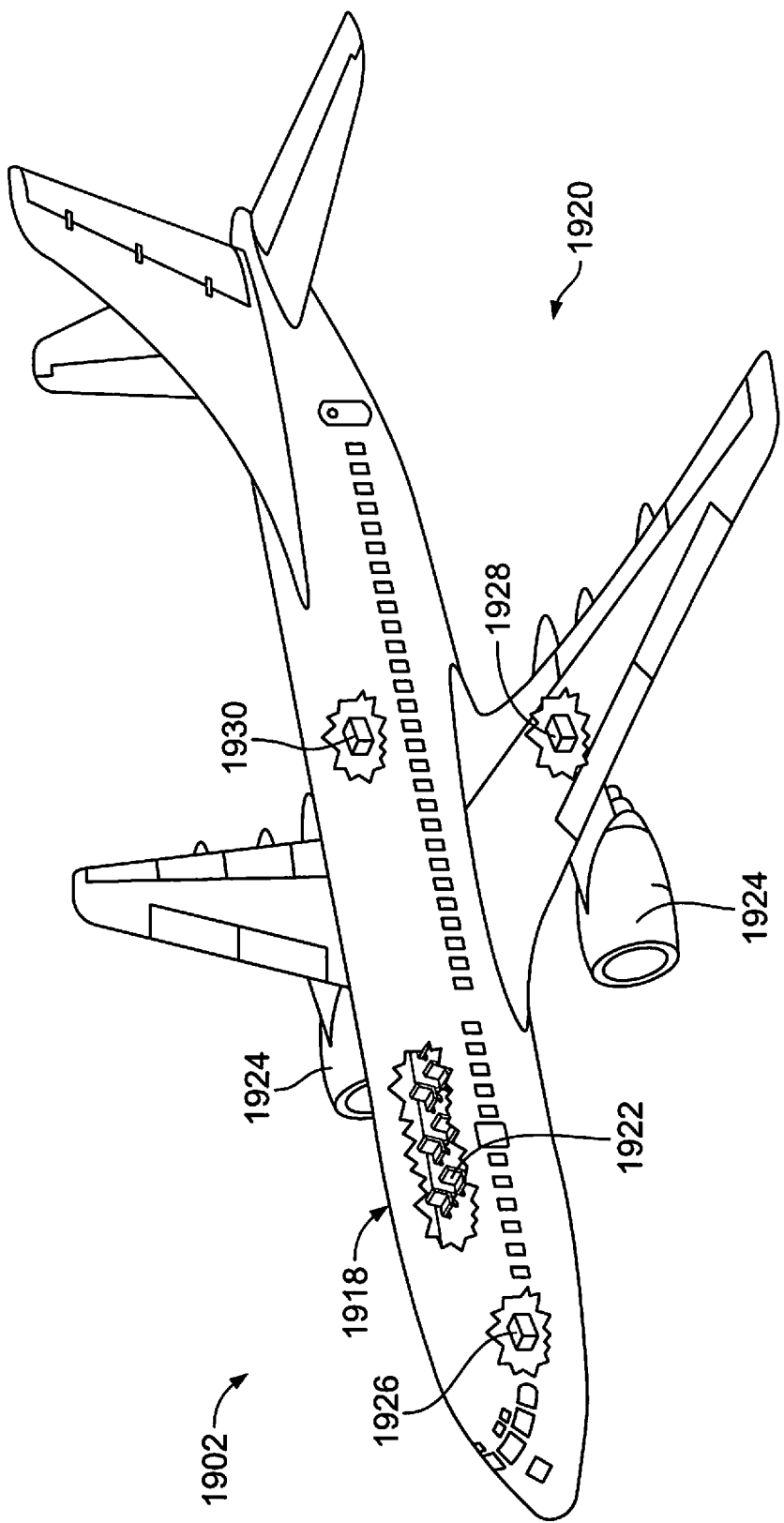
FIG. 11 is a schematic illustration of an aircraft.

Examples of the present disclosure may be described in the context of aircraft manufacturing and service method 1900 as shown in FIG. 10 and aircraft 1902 as shown in FIG. 11. During pre-production, illustrative method 1900 may include specification and design (block 1904) of aircraft 1902 and material procurement (block 1906). During production, component and subassembly manufacturing (block 1908) and system integration (block 1910) of aircraft 1902 may take place. Thereafter, aircraft 1902 may go through certification and delivery (block 1912) to be placed in service (block 1914). While in service, aircraft 1902 may be scheduled for routine maintenance and service (block 1916). Routine maintenance and service may include modification, reconfiguration, refurbishment, etc. of one or more systems of aircraft 1902. For example, in various embodiments, examples of the present disclosure may be used in conjunction with one or more of blocks 1908 or 1916.

Each of the processes of illustrative method 1900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, aircraft 1902 produced by illustrative method 1900 may include airframe 1918 with a plurality of high-level systems 1920 and interior 1922. Examples of high-level systems 1920 include one or more of propulsion system 1924, electrical system 1926, hydraulic system 1928, and environmental system 1930. Any number of other systems may be included. Although an aerospace example is shown, the principles disclosed herein may be applied to other industries, such as the automotive industry. Accordingly, in addition to aircraft 1902, the principles disclosed herein may apply to other vehicles, e.g., land vehicles, marine vehicles, space vehicles, etc. In various embodiments, examples of the present disclosure may be used in conjunction with airframe 1918.

Apparatus(es) and method(s) shown or described herein may be employed during any one or more of the stages of the manufacturing and service method 1900. For example, components or subassemblies corresponding to component and subassembly manufacturing 1908 may be fabricated or manufactured in a manner similar to components or subassemblies produced while aircraft 1902 is in service. Also, one or more examples of the apparatus(es), method(s), or combination thereof may be utilized during production stages 1908 and 1910, for example, by substantially expediting assembly of or reducing the cost of aircraft 1902. Similarly, one or more examples of the apparatus or method realizations, or a combination thereof, may be utilized, for example and without limitation, while aircraft 1902 is in service, e.g., maintenance and service stage (block 1916).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It should be noted that the particular arrangement of components (e.g., the number, types, placement, or the like) of the illustrated embodiments may be modified in various alternate embodiments. For example, in various embodiments, different numbers of a given component may be employed, a different type or types of a given component may be employed, a number of components (or aspects thereof) may be combined, a given component may be divided into plural components, one or more aspects of one or more components may be shared between components, a given component may be added, or a given component may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A dry bay sealing assembly comprising:
   a first end plate and a second end plate configured to be disposed on respective opposite first and second sides of a structural member proximate to a joint defined between the structural member and a fitting, the first end plate and the second end plate configured to define an interior volume therebetween containing at least a portion of a fastener joining the structural member and the fitting, the first end plate and the second end plate configured to cooperate with the structural member to seal the interior volume from an exterior volume; and
   an end plate fastener extending across the structural member and a width of the interior volume, the end plate fastener joining the first end plate to the second end plate disposed opposite the first end plate.

2. The dry bay sealing assembly of claim 1, wherein the structural member comprises a web extending between first and second flanges, wherein the first end plate and the second end plate are configured to be mounted on opposite sides of the web.

3. The dry bay sealing assembly of claim 2, wherein the first flange extends toward a front end of the structural member farther than the second flange extends toward the front end, the front end disposed proximate the fitting, the dry bay sealing assembly further comprising a bridge configured to extend between the first end plate and the second end plate proximate the front end.

4. The dry bay sealing assembly of claim 3, wherein the end plate fastener extends past a portion of the web that does not extend to meet the bridge or the front end of the structural member.

5. The dry bay sealing assembly of claim 2, wherein the fitting comprises a fitting flange configured to be joined to the first flange of the structural member, wherein at least one of the first end plate or the second end plate comprises a channel configured to accept the first flange and the fitting flange.

6. The dry bay sealing assembly of claim 1, wherein the end plate fastener extends at an oblique angle to a plane defined by a web of the structural member.

7. The dry bay sealing assembly of claim 1, wherein at least one of the first end plate or the second end plate is formed to correspond to a contour of the structural member.

8. A method comprising:
   joining a structural member to a fitting at a joint using at least one fastener, wherein at least a portion of the at least one fastener extends into an interior of the structural member;
   positioning a first end plate on a first side of the structural member;
   positioning a second end plate on a second side of the structural member to define an interior volume, wherein the at least a portion of the at least one fastener that extends into the interior of the structural member is contained within the interior volume;
   joining the first end plate and the second end plate with an end plate fastener extending across the structural member and a width of the interior volume; and
   sealing at least the first end plate, second end plate, and structural member to provide a seal between the interior volume and an exterior volume.

9. The method of claim 8, wherein the structural member comprises a web extending between first and second flanges, wherein the first end plate and second end plates are positioned on opposite sides of the web.

10. The method of claim 9, wherein the first flange extends toward a front end of the structural member farther than the second flange extends toward the front end, the front end disposed proximate the fitting, the method further comprising positioning a bridge between the first end plate and the second end plate proximate the front end.

11. The method of claim 9, further comprising joining a fitting flange of the fitting to the first flange of the structural member, wherein at least one of the first end plate or the second end plate comprises a channel configured to accept the first flange and the fitting flange.

12. The method of claim 8, further comprising positioning a bridge proximate a front end of the structural member and between the first and second end plates before joining the first and second end plates with the end plate fastener.

13. The method of claim 12, wherein the end plate fastener extends past a portion of the web that does not extend to meet the bridge or the front end of the structural member.

14. The method of claim 8, wherein the end plate fastener extends at an oblique angle to a plane defined by a web of the structural member.

15. The method of claim 8, further comprising forming at least one of the first or second end plates to correspond to a contour of the structural member.

16. An airplane wing joint assembly comprising:

a fitting configured to be joined to a body of the airplane;

a structural member configured to be joined to a wing of the airplane, the wing defining a fuel carrying volume, the structural member joined to the fitting at a joint by at least one fastener;

a first end plate and a second end plate disposed on respective opposite first and second sides of the structural member proximate to the joint defined between the structural member and the fitting, the first end plate and the second end plate configured to define an interior volume therebetween containing at least a portion of the at least one fastener joining the structural member and the fitting, the first end plate and the second end plate cooperating with the structural member to seal the interior volume from the fuel carrying volume; and an end plate fastener extending across the structural member and a width of the interior volume, the end plate fastener joining the first end plate to the second end plate disposed opposite the first end plate.

17. The airplane wing joint assembly of claim 16, wherein the structural member comprises a web extending between first and second flanges, wherein the first end plate and the second end plate are configured to be mounted on opposite sides of the web, wherein the first flange extends toward a front end of the structural member farther than the second flange extends toward the front end, the front end disposed proximate the fitting, the airplane wing joint assembly further comprising a bridge configured to extend between the first end plate and the second end plate proximate the front end.

18. The airplane wing joint assembly of claim 17, wherein the fitting comprises a fitting flange configured to be joined to the first flange of the structural member, wherein at least one of the first end plate or the second end plate comprises a channel configured to accept the first flange and the fitting flange.

19. The airplane wing joint assembly of claim 17, wherein the end plate fastener extends past a portion of the web that does not extend to meet the bridge or the front end of the structural member.

20. The airplane wing joint assembly of claim 16, wherein the end plate fastener extends at an oblique angle to a plane defined by a web of the structural member.

* * * * *